(12) United States Patent  
Copper et al.

(10) Patent No.: US 9,404,523 B2  
(45) Date of Patent: Aug. 2, 2016

(54) BOLT RETENTION APPARATUS AND METHOD

(71) Applicant: Koyo Bearings North America LLC, Westlake, OH (US)

(72) Inventors: Anthony P. Copper, Greenville, SC (US); Justin R. Ballenger, Easley, SC (US)

(73) Assignee: Koyo Bearings North America LLC, Westlake, OH (US)

( * ) Notice: Subject to any disclaimer, the term of this patent is extended or adjusted under 35 U.S.C. 154(b) by 212 days.

(21) Appl. No.: 14/169,655

(22) Filed: Jan. 31, 2014

(65) Prior Publication Data

US 2014/0144004 A1    May 29, 2014

Related U.S. Application Data

(62) Division of application No. 13/080,972, filed on Apr. 6, 2011, now Pat. No. 8,641,341.

(60) Provisional application No. 61/323,913, filed on Apr. 14, 2010.

(51) Int. Cl.

| *F16B 21/18* | (2006.01) |
| *F16B 33/00* | (2006.01) |
| *F16B 37/00* | (2006.01) |
| *F16B 41/00* | (2006.01) |
| *F16B 25/00* | (2006.01) |

(52) U.S. Cl.  
CPC .............. *F16B 33/00* (2013.01); *F16B 37/005* (2013.01); *F16B 41/002* (2013.01); *F16B 25/0057* (2013.01); *Y10T 29/49948* (2015.01)

(58) Field of Classification Search  
CPC ........ F16B 33/00; F16B 41/002; F16B 37/005  
See application file for complete search history.

(56) References Cited

U.S. PATENT DOCUMENTS

| 1,788,408 A | 1/1931 | Raybould |
| 1,927,780 A | 9/1933 | Anderson |
| 2,311,299 A | 2/1943 | Olson |
| 2,460,613 A | 2/1949 | Whelan et al. |

(Continued)

FOREIGN PATENT DOCUMENTS

| CN | 1216598 | 5/1999 |
| FR | 2416369 | 8/1979 |
| FR | 2692634 | 12/1993 |

OTHER PUBLICATIONS

Fig. A with statement of relevance (2 pages).

(Continued)

*Primary Examiner* — Gary Estremsky  
(74) *Attorney, Agent, or Firm* — Nelson Mullins Riley & Scarborough, LLP

(57) ABSTRACT

A unitized component assembly includes an component having an aperture, and a plurality of discrete projections extending into the aperture and spaced apart from one another about the perimeter of the aperture, and a fastener having a head and a shank extending from the head. The shank includes a necked portion and a threaded portion adjacent the necked portion. The shank is positioned in the aperture such that the necked portion is in facing relationship with the projections. The threaded portion is engageable with the projections to provide an axial stop for limiting movement of the fastener relative to the component.

19 Claims, 8 Drawing Sheets

(56) References Cited

U.S. PATENT DOCUMENTS

| | | |
|---|---|---|
| 2,568,584 A | 9/1951 | Hartman |
| 2,761,484 A | 9/1956 | Sternick et al. |
| 2,765,834 A | 10/1956 | Poupitch |
| 2,779,376 A | 1/1957 | Poupitch |
| 2,817,380 A | 12/1957 | Knohl |
| 2,829,696 A | 4/1958 | Wagner |
| 2,850,781 A | 9/1958 | Pachmayr |
| 2,907,419 A | 10/1959 | Klank, Jr. |
| 2,922,211 A | 1/1960 | Boyd |
| 2,929,474 A | 3/1960 | Boardman |
| 2,987,811 A * | 6/1961 | Acres .................. F16B 35/041 29/437 |
| 3,018,127 A | 1/1962 | Dobrosielski et al. |
| 3,062,253 A | 11/1962 | Millheiser |
| 3,083,796 A | 4/1963 | Bell |
| 3,153,972 A | 10/1964 | Holton |
| 3,221,794 A | 12/1965 | Acres |
| 3,244,212 A | 4/1966 | Barry |
| 3,378,806 A | 4/1968 | Wilkerson et al. |
| 3,412,774 A | 11/1968 | Schuster |
| 3,426,321 A | 2/1969 | Peterson, Jr. |
| 3,465,803 A | 9/1969 | Ernest et al. |
| 3,472,303 A | 10/1969 | Beard |
| 3,483,612 A | 12/1969 | Rogge |
| 3,556,570 A | 1/1971 | Cosenza |
| 3,571,904 A | 3/1971 | Gulistan |
| 3,862,458 A | 1/1975 | Stanaitis |
| 3,878,042 A | 4/1975 | Curulla et al. |
| 3,892,031 A | 7/1975 | Bisbing |
| 3,913,649 A | 10/1975 | Stanaitis |
| 3,967,875 A | 7/1976 | Stanaitis |
| 3,995,675 A | 12/1976 | Cosenza |
| 4,040,715 A | 8/1977 | Debaigt |
| 4,069,855 A | 1/1978 | Petroshanoff |
| 4,157,725 A | 6/1979 | Stanaitis |
| 4,462,730 A | 7/1984 | Knohl |
| 4,640,524 A | 2/1987 | Sedlmair |
| 4,655,658 A | 4/1987 | Gulistan |
| 4,790,702 A | 12/1988 | Maganias |
| 4,877,364 A | 10/1989 | Sorrentino |
| 4,889,457 A | 12/1989 | Hageman |
| 4,934,888 A | 6/1990 | Corsmeier et al. |
| 4,963,063 A | 10/1990 | Gulistan |
| 4,975,007 A | 12/1990 | Molina |
| 5,020,951 A | 6/1991 | Smith |
| 5,052,643 A | 10/1991 | Law |
| 5,056,208 A | 10/1991 | Stafford |
| 5,059,075 A | 10/1991 | Kelly |
| 5,064,324 A | 11/1991 | Ragaller |
| 5,154,559 A | 10/1992 | Wagner |
| 5,244,325 A | 9/1993 | Knohl |
| 5,256,019 A | 10/1993 | Phillips |
| 5,256,020 A | 10/1993 | Ikeda et al. |
| 5,290,132 A * | 3/1994 | Gnage .................. F16B 41/002 411/107 |
| 5,352,056 A | 10/1994 | Chandler |
| 5,388,940 A | 2/1995 | Herren |
| 5,511,301 A | 4/1996 | McGuire |
| 5,662,444 A | 9/1997 | Schmidt, Jr. |
| 5,711,711 A | 1/1998 | Schmidt, Jr. |
| 5,807,052 A | 9/1998 | Van Boven et al. |
| 6,044,536 A | 4/2000 | Schneider |
| 6,059,503 A | 5/2000 | Johnson |
| 6,077,012 A | 6/2000 | Granese et al. |
| 6,079,920 A | 6/2000 | Dispenza |
| 6,082,943 A | 7/2000 | Schneider |
| 6,176,665 B1 | 1/2001 | Bondarowicz et al. |
| 6,227,783 B1 * | 5/2001 | Salameh ............... A47B 61/00 411/107 |
| 6,309,156 B1 | 10/2001 | Schneider |
| 6,309,157 B1 | 10/2001 | Amann et al. |
| 6,361,259 B1 | 3/2002 | Koeppel et al. |
| 6,379,093 B1 | 4/2002 | Bondarowicz et al. |
| 6,582,171 B2 | 6/2003 | Bondarowicz et al. |
| 6,585,468 B2 | 7/2003 | Johnson et al. |
| 6,623,226 B2 * | 9/2003 | Braun ...................... F16B 5/02 411/107 |
| 6,685,409 B2 | 2/2004 | Braun et al. |
| 6,688,826 B2 | 2/2004 | Agha et al. |
| 6,722,832 B2 * | 4/2004 | Hartmann ............ F16B 41/002 411/107 |
| 6,769,851 B2 | 8/2004 | Agha et al. |
| 6,860,689 B1 | 3/2005 | Attanasio |
| 6,872,040 B2 | 3/2005 | Deeg et al. |
| 6,884,014 B2 | 4/2005 | Stone et al. |
| 7,207,762 B2 | 4/2007 | Teal |
| 7,290,971 B2 | 11/2007 | Bakos |
| 7,377,735 B2 | 5/2008 | Cosenza et al. |
| 7,462,008 B2 | 12/2008 | Attanasio |
| 7,488,135 B2 | 2/2009 | Hasegawa |
| 7,841,818 B2 | 11/2010 | Attanasio |
| 7,950,886 B2 | 5/2011 | Siegal |
| 8,020,278 B2 | 9/2011 | Kovac |
| 2002/0009351 A1 | 1/2002 | Bondarowicz et al. |
| 2003/0108401 A1 | 6/2003 | Agha et al. |
| 2004/0022600 A1 | 2/2004 | Kovac |
| 2004/0086353 A1 | 5/2004 | Diaconu |
| 2005/0169728 A1 | 8/2005 | Attanasio |
| 2005/0207866 A1 | 9/2005 | Attanasio |
| 2006/0180116 A1 | 8/2006 | Vaandrager et al. |
| 2006/0216133 A1 | 9/2006 | Cosenza et al. |
| 2007/0014650 A1 * | 1/2007 | Hain .................... F16B 41/002 411/353 |
| 2007/0204826 A1 | 9/2007 | Diggs et al. |
| 2009/0232617 A1 | 9/2009 | Sessa |
| 2011/0033262 A1 | 2/2011 | Gulistan |

OTHER PUBLICATIONS

Fig. B with statement of relevance (2 pages).
Fig. C with statement of relevance (2 pages).
UltraFast Pre-Assembled Fasteners and Plates, Johns Manville, May 2008.
Office Action dated Nov. 28, 2011 for U.S. Appl. No. 12/361,973.
Amendment to Office Action dated Nov. 28, 2011 for U.S. Appl. No. 12/361,973.
Final Office Action dated May 22, 2012 for U.S. Appl. No. 12/361,973.
Amendment to Final Office Action dated May 22, 2012 for U.S. Appl. No. 12/361,973.
Office Action dated Nov. 12, 2012, for Chinese Patent Application No. 201110092962.0.
Second Office Action dated Jul. 11, 2013 for Chinese Patent Application No. 20111009262.0.
Third Office Action dated Feb. 24, 2014 for Chinese Patent Application No. 20111009262.0.

* cited by examiner

BOLT RETENTION APPARATUS AND METHOD

CLAIM OF PRIORITY

This application is a division of U.S. patent application Ser. No. 13/080,972, filed Apr. 6, 2011, which claims priority to U.S. Provisional Patent Application No. 61/323,913, filed Apr. 14, 2010, the entire disclosures of which are incorporated by reference herein.

FIELD OF THE INVENTION

The present invention relates to fasteners.

BACKGROUND OF THE INVENTION

When securing components with fasteners, the fasteners are typically provided separately from the components themselves and must be brought to the components using either an automated or manual process during assembly of the components. For example, when securing two components by a bolt, the two components are often first brought together in their final assembled positions, the bolt is then brought to the pre-assembled components, and lastly the bolt is inserted through respective apertures in the components and tightened to secure the components together.

SUMMARY OF THE INVENTION

Unitizing fasteners with one or more of the components which the fasteners will secure can reduce the number of steps required to assemble the components and subsequently decrease the amount of time spent on the component assembly.

The present invention provides, in one aspect, a unitized component assembly including an component having an aperture, and a plurality of discrete projections extending into the aperture and spaced apart from one another about the perimeter of the aperture. The unitized component assembly further includes a fastener having a head and a shank extending from the head. The shank includes a necked portion and a threaded portion adjacent the necked portion. The shank is positioned in the aperture such that the necked portion is in facing relationship with the projections. The threaded portion is engageable with the projections to provide an axial stop for limiting movement of the fastener relative to the component.

The present invention provides, in another aspect, a method of unitizing a fastener and a component. The method includes providing the component with an aperture, and a plurality of discrete projections extending into the aperture and spaced apart from one another about the perimeter of the aperture. The method further includes providing the fastener with a head and a shank having a necked portion and a threaded portion adjacent the necked portion, inserting the shank into the aperture, at least partially deforming each of the projections during insertion of the threaded portion of the shank into the aperture, positioning the necked portion of the fastener in facing relationship with the projections after the projections have been deformed by the threaded portion of the shank, and engaging the threaded portion of the shank with the projections to provide an axial stop for limiting movement of the fastener relative to the component.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
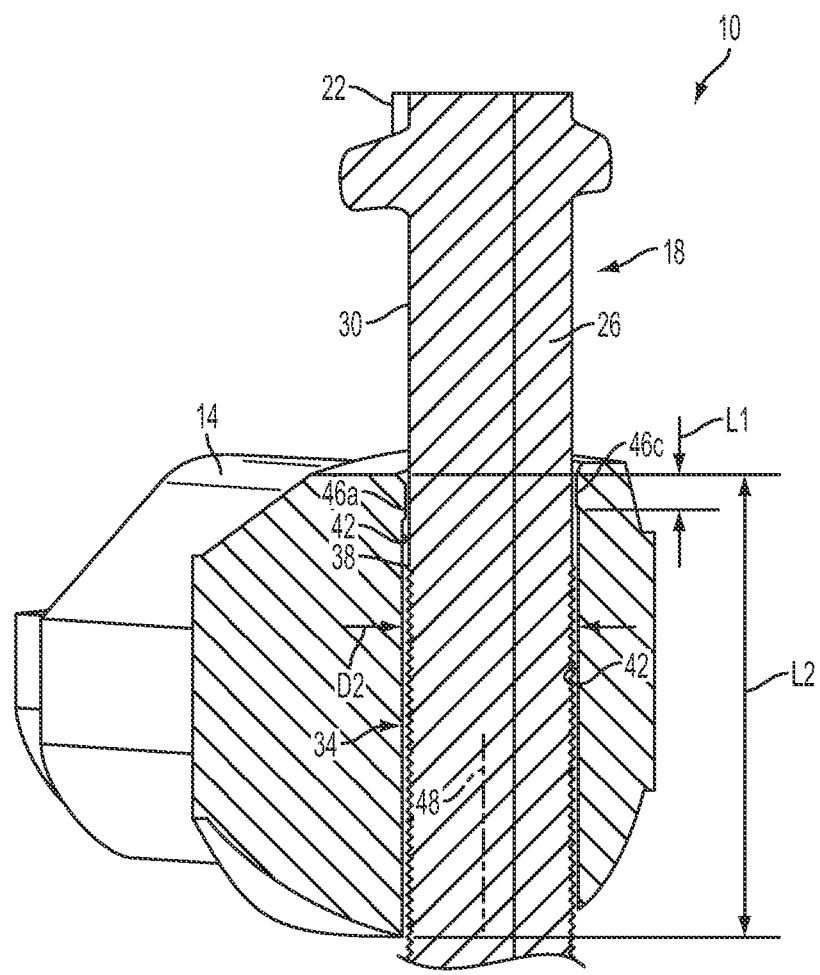
FIG. 1 is a cross-sectional view of a first construction of a unitized component assembly of the invention, including a component and a fastener unitized to the component.

FIG. 1 illustrates a first construction of a unitized component assembly 10 according to the invention. The assembly 10 includes a component (e.g., an engine component 14) and a fastener 18 coupled to the engine component 14. The illustrated engine component 14 is configured as a rocker arm pivot of an engine valve train. Alternatively, the engine component 14 may be configured as any of a number of different components that are secured to the engine using the fastener 18. The fastener 18 includes a head 22 and a shank 26 extending from the head 22. Although the illustrated fastener 18 is in the form of a bolt, the fastener 18 may be configured in any of a number of different ways. The shank 26 includes a non-threaded necked portion 30 spaced from the head 22 and having a reduced diameter relative to the portions of the shank 26 adjacent the necked portion 30. The shank 26 also includes a threaded portion 34 adjacent the necked portion 30. Alternatively, the necked portion 30 of the shank 26 may be spaced from the threaded portion 34 of the shank 26. Further, the necked portion 30 of the shank 26 is adjacent the head 22. The necked portion 30 of the shank 26 is defined between the head 22 and a shoulder on the shank 26, which substantially coincides with an upper extent 38 of the threaded portion 34. At least part of the threaded portion 34 (e.g., the first few lower threads) may be heat treated to increase the hardness of the threaded portion 34.

Figure 2:
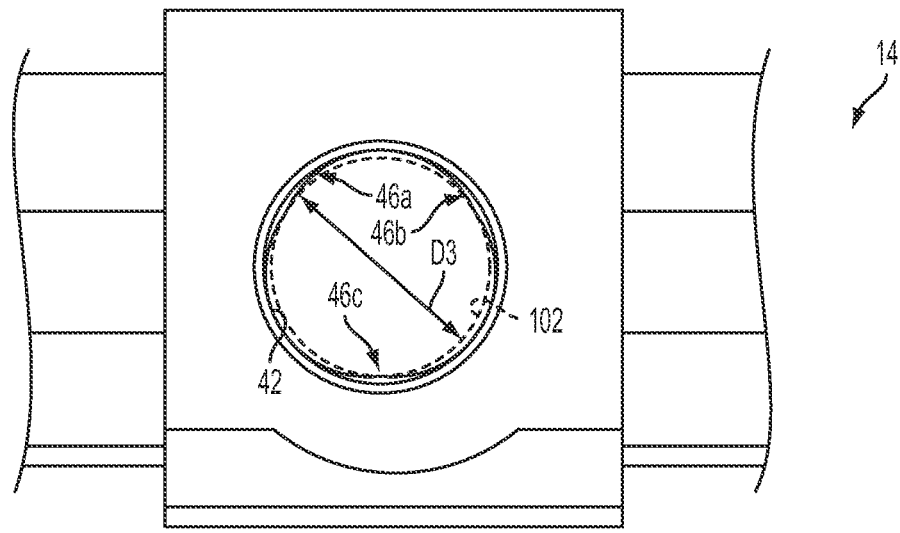
FIG. 2 is a top view of the component of FIG. 1, illustrating an aperture and a plurality of discrete projections extending into the aperture.
Figure 3:
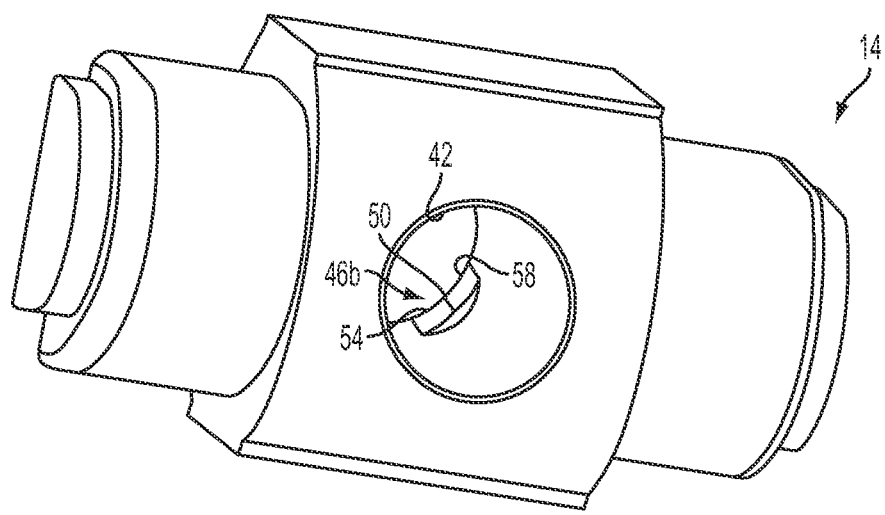
FIG. 3 is a perspective view of the component of FIG. 1, illustrating one of the discrete projections.

The engine component 14 includes an aperture 42 (FIG. 3) and a plurality of discrete projections 46a, 46b, 46c (FIG. 2) extending into the aperture 42. As shown in FIG. 2, the projections 46a, 46b, 46c are spaced apart from one another about the perimeter of the aperture 42. Specifically, the engine component 14 includes three projections 46a, 46b, 46c that are equidistantly spaced from each other by an angle A of about 120 degrees (FIG. 4) with respect to a central axis 48 of the aperture 42. Each of the projections 46a, 46b, 46c includes an apex 50 and respective curved or arcuate surfaces 54, 58 on either side of the apex 50. Respective planes 62a, 62b, 62c pass through the central axis 48 and the apices 50 of the respective projections 46a, 46b, 46c. As such, the planes 62a, 62b, 62c separate the arcuate surfaces 54, 58 of each of the projections 46a, 46b, 46c.

Figure 4:
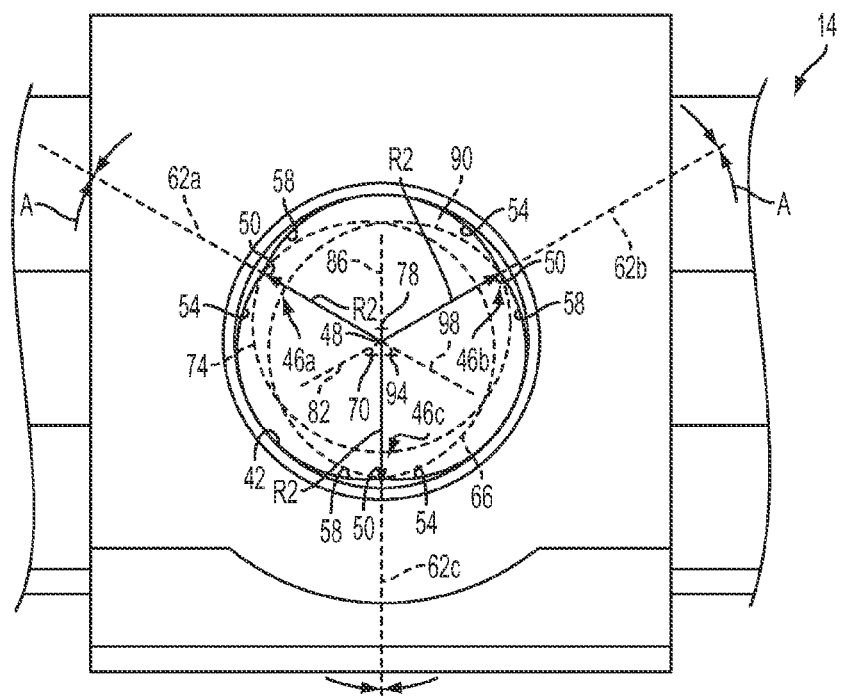
FIG. 4 is a top view of a portion of the component of FIG. 1, illustrating a first series of manufacturing steps used to create the projections.
Figure 5:
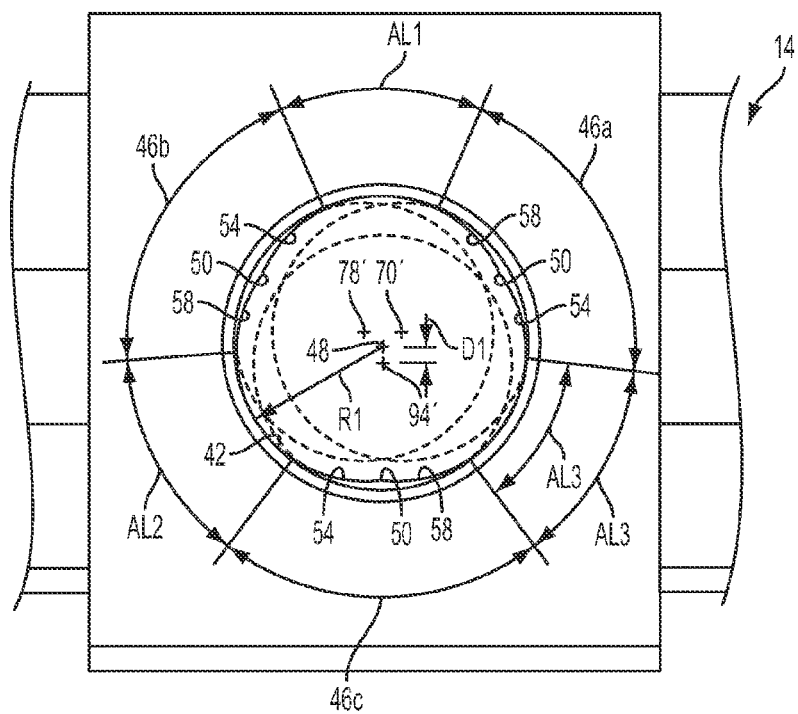
FIG. 5 is a bottom view of the portion of the component of FIG. 4, illustrating a second series of manufacturing steps used to create the projections.

With reference to FIG. 5, the projections 46a, 46b are separated from each other by an arc length AL1 defined by a constant radius R1 with respect to the central axis 48. Likewise, the projections 46b, 46c and the projections 46c, 46a are separated from each other by respective arc lengths AL2, AL3 each defined by the constant radius R1 with respect to the central axis 48. With continued reference to FIG. 5, the arcuate surface 54 of the projection 46a is defined by a continually decreasing radius having an origin coaxial with the central axis 48, sweeping in a counterclockwise direction from the arc length AL3, having a maximum value corresponding with the radius R1 of the arc length AL3, and a minimum value corresponding with a radial dimension R2 (FIG. 4) between the apex 50 of the projection 46a and the central axis 48. Likewise, with reference to FIG. 5, the arcuate surface 58 of the projection 46a is defined by a continually increasing radius having an origin coaxial with the central axis 48, sweeping in a counterclockwise direction from the apex 50, having a minimum value corresponding with the radial dimension R2 (FIG. 4) between the apex 50 of the projection 46a and the central axis 48, and a maximum value corresponding with the radius R1 of the arc length AL1 (FIG. 5). The projection 46b is defined in a similar manner relative to the arc lengths AL1, AL2 on either side of the projection 46b, and the projection 46c is defined in a similar manner relative to the arc lengths AL2, AL3 on either side of the projection 46c.

With reference to FIG. 4, the projection 46a is defined by the outer peripheral surface of a first cylinder 66 having a central axis 70 oriented substantially parallel to the central axis 48, and the outer peripheral surface of a second cylinder 74 having a central axis 78 oriented substantially parallel with the central axis 48. Specifically, the central axis 70 is aligned with a plane 82 passing through the central axis 48 and angularly offset from the plane 62a by about 60 degrees in a counterclockwise direction from the point of view of FIG. 4. Likewise, the central axis 78 is aligned with a plane 86 passing through the central axis 48 and angularly offset from the plane 62b by about 60 degrees in a counterclockwise direction from the point of view of FIG. 4. Each of the axes 70, 78 is spaced from the central axis 48 in a radial direction by a dimension D1 (shown in FIG. 5 with respect to reoriented axes 70', 78', which are equidistant to the central axis 48 as the axes 70, 78 in FIG. 4, respectively), in which the ratio of the dimension D1 to the radius R1 of each of the arc lengths AL1, AL2, AL3 is between about 0.05:1 and about 0.15:1. In the illustrated construction of the engine component assembly 10, the ratio of the dimension D1 to the radius R1 of each of the arc lengths AL1, AL2, AL3 is about 0.10:1.

With reference to FIG. 4, the projection 46b is defined by the outer peripheral surface of the second cylinder 74, and the outer peripheral surface of a third cylinder 90 having a central axis 94 oriented substantially parallel with the central axis 48. Specifically, the central axis 94 is aligned with a plane 98 passing through the central axis 48 and angularly offset from the plane 62c by about 60 degrees in a counterclockwise direction from the point of view of FIG. 4. The axis 94 is also spaced from the central axis 48 in a radial direction by the dimension D1. The projection 46c is defined by the outer peripheral surface of the third cylinder 90 and the outer peripheral surface of the first cylinder 66.

With reference to FIG. 1, each of the projections 46a, 46b, 46c includes an axial length L1 that is less than the axial length L2 of the aperture 42. Specifically, the ratio of the axial length L1 of each of the projections 46a, 46b, 46c to the axial length L2 of the aperture 42 is about 0.150:1 or less. In the illustrated construction of the engine component assembly 10, the projections 46a, 46b, 46c are positioned toward the upper end of the aperture 42. Alternatively, the projections 46a, 46b, 46c may be positioned toward the bottom end of the aperture 42, the middle of the aperture 42, or at any location along the length of the aperture 42. The aperture 42 includes a substantially circular cross-section, defining a diameter D2, below the projections 46a, 46b, 46c. In the illustrated construction of the engine component assembly 10, the diameter D2 is equal to twice the radius R1 (FIG. 5) of each of the arc lengths AL1, AL2, AL3. Alternatively, the diameter D2 may not coincide with twice the radius R1 of each of the arc lengths AL1, AL2, AL3. The apices 50 (FIG. 4) of the respective projections 46a, 46b, 46c are tangent to a circle 102 (FIG. 2) concentric with the aperture 42 and having a diameter D3. Preferably, the ratio of the diameter D3 to the diameter D2 is between about 0.92:1 and about 0.98:1. In the illustrated construction of the engine component assembly 10, the ratio of the diameter D3 to the diameter D2 is about 0.95:1.

To manufacture the engine component 14, the body of the component 14 is first created (e.g., using a powdered metal process, a casting process, a forging process, etc.). Then, the projections 46a, 46b, 46c are machined into the body of the engine component 14 such that the projections 46a, 46b, 46c are integral with the engine component 14 as a single piece. To machine the projections 46a, 46b, 46c, a drill bit having a diameter coinciding with the diameter of the first cylinder 66 is used during a first boring process to bore a hole into the body of the engine component 14, from the top of the engine component 14, that is coaxial with the axis 70 (see FIG. 4) to create the arc length AL3. The drill bit is then used in a second boring process, in which the bit is aligned with the axis 78, to create the arc length AL1. The drill bit is then used in a third boring process, in which the bit is aligned with the axis 94, to create the arc length AL2. The projections 46a, 46b, 46c, with an axial length L1 corresponding to the axial length L2 of the aperture, are created from the first, second, and third boring processes.

As mentioned above, the first, second, and third boring processes are performed with the drill bit being inserted from the top of the engine component 14. After the first, second, and third boring processes are completed, the engine component 14 is re-oriented such that the drill bit may be inserted from the bottom of the engine component 14 (shown in FIG.

5). A series of three additional boring processes is used to create the circular profile of the aperture 42 beneath the projections 46a, 46b, 46c. With reference to FIG. 5, the drill bit is aligned with the axis 70', which corresponds with the position of the axis 70 if the axis 70 were angularly shifted about the central axis 48 in a clockwise direction by about 60 degrees relative to the top view of the engine component 14 in FIG. 4. Then, the drill bit is plunged into the bottom of the engine component 14 during a fourth boring process to remove some of the material that is left over from the first and second boring processes. However, the drill bit is only partially plunged through the engine component 14, thereby leaving the projection 46a after completion of the fourth boring process.

Likewise, the drill bit is then aligned with the axis 78', which corresponds with the position of the axis 78 if the axis 78 were angularly shifted about the central axis 48 in a clockwise direction by about 60 degrees relative to the top view of the engine component 14 in FIG. 4. The drill bit is plunged into the bottom of the engine component 14 during a fifth boring process to remove some of the material left over from the second and third boring processes. However, the drill bit is only partially plunged through the engine component 14, thereby leaving the projection 46b after completion of the fifth boring process. Finally, the drill bit is aligned with the axis 94', which corresponds with the position of the axis 94 if the axis 94 were angularly shifted about the central axis 48 in a clockwise direction by about 60 degrees relative to the top view of the engine component 14 in FIG. 4. The drill bit is plunged into the bottom of the engine component 14 during a sixth boring process to remove some of the material left over from the first and third boring processes. However, the drill bit is only partially plunged through the engine component 14, thereby leaving the projection 46c after completion of the sixth boring process. The boring processes discussed above include machining a pre-manufactured engine component body. Alternatively, the fourth, fifth, and sixth boring processes may be substituted with a single boring process using a drill bit having a diameter corresponding with the machined diameter D2 of the aperture 42. As a further alternative, the projections 46a, 46b, 46c may be integrally formed with the body of the engine component 14 as a single piece, during the creation of the engine component body itself (e.g., using a powdered metal process, a casting process, a forging process, etc.).

To unitize the fastener 18 and the engine component 14, the shank 26 is initially aligned with the central axis 48 and inserted into the aperture 42. During insertion of the shank 26 into the aperture 42, the threaded portion 34 of the fastener 18 contacts the projections 46a, 46b, 46c, thereby preventing continued axial movement of the fastener 18 into the aperture 42. Then, the fastener 18 is rotated in a clockwise direction (i.e., for right-handed threads) to at least partially deform at least one thread into each of the discrete projections 46a, 46b, 46c. As the fastener 18 forms the threads in the discrete projections 46a, 46b, 46c, the fastener 18 also moves axially into the aperture 42. The fastener 18 is capable of forming threads into the engine component 14 because the fasteners 18 (i.e., at least the first few threads of the threaded portion 34) are made from a harder material than the engine component 14. Also, because the three discrete projections 46a, 46b, 46c are used on the engine component 14 to simulate "point" contact with the fastener 18, and the ratio of the diameter D3 to the diameter D2 is between about 0.92:1 and about 0.98:1, the fasteners 18 may be hand-threaded into the aperture 42 without the aid of tools. In other words, the projections 46a, 46b, 46c need not be pre-threaded before insertion of the fastener 18 into the aperture 42, thereby eliminating a manufacturing process (e.g., threading the projections 46a, 46b, 46c prior to insertion of the fastener 18) and its associated costs.

Figure 6:
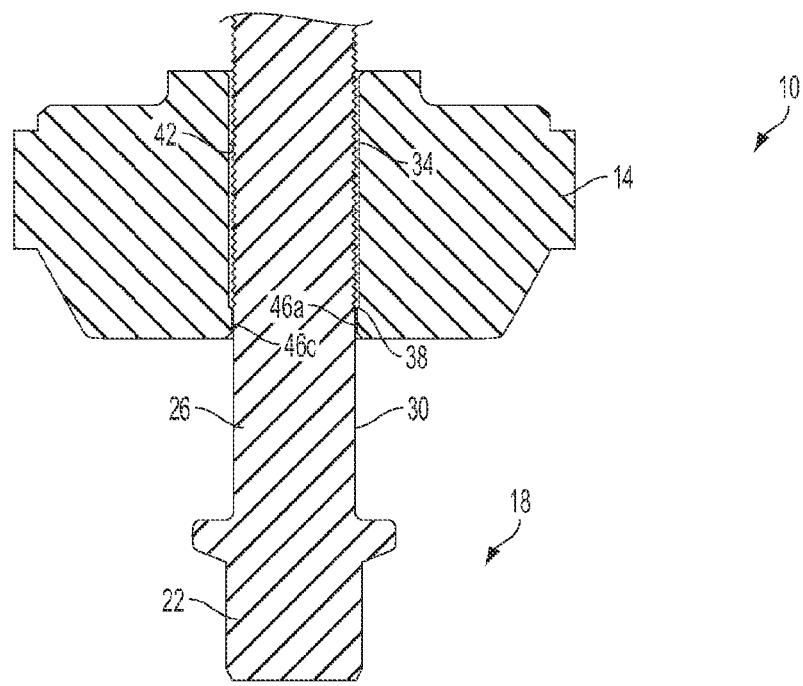
FIG. 6 is a cross-sectional view of the unitized component assembly of FIG. 1, illustrating a threaded portion on the shank of the fastener engaging the projections to prevent removal of the shank from the aperture in the component.
Figure 7:
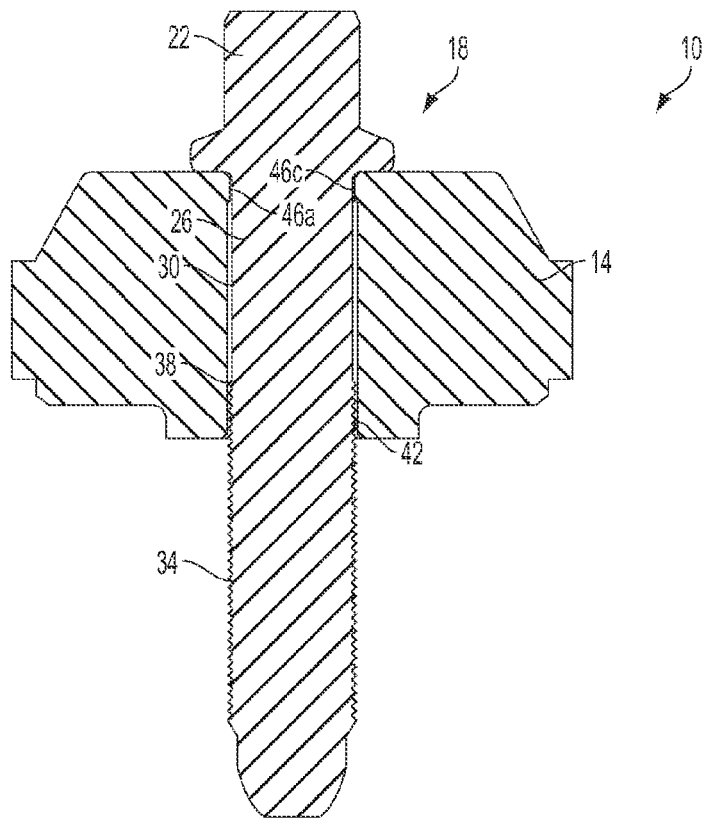
FIG. 7 is a cross-sectional view of the unitized component assembly of FIG. 1, illustrating the head of the fastener engaging the component to prevent removal of the shank from the aperture in the component.

Upon continued rotation of the fastener 18, the threaded portion 34 of the fastener 18 eventually disengages the projections 46a, 46b, 46c, such that the projections 46a, 46b, 46c are in facing relationship with the necked portion 30. In other words, once the threaded portion 34 of the fastener 18 disengages the projections 46a, 46b, 46c, the fastener 18 may be axially slidable within the aperture 42 by an amount corresponding to the length of the necked portion 30. FIG. 6 illustrates the fastener 18 in a first position with respect to the engine component 14, in which the threaded portion 34 of the shank 26 is engaged with the projections 46a, 46b, 46c to prevent removal of the shank 26 from the aperture 42. In other words, the threaded portion 34 is engageable with the projections 46a, 46b, 46c to provide an axial stop for limiting movement of the fastener 18 relative to the engine component 14. FIG. 7 illustrates the fastener 18 in a second position with respect to the engine component 14, in which the head 22 is engaged with the top of the engine component 14. Because the necked portion 30 has a smaller diameter than that of the projections 46a, 46b, 46c, the fastener 18 is axially movable between the first and second positions without being rotated. However, should one desire to remove the fastener 18 from the aperture 42, the fastener 18 must be positioned to reengage the threaded portion 34 and the projections 46a, 46b, 46c, and then rotated in a counterclockwise direction to unscrew the fastener 18 from the engine component 14.

The projections 46a, 46b, 46c facilitate handling of the fastener 18 and the engine component 14 as a unit, without substantial concern that the fastener 18 and the engine component 14 may become unintentionally separated. For example, FIGS. 6 and 7 illustrate the retention of the fastener 18 to the engine component 14 while the engine component 14 is situated in an inverted orientation and a non-inverted orientation, respectively. When the engine component 14 is handled in an inverted orientation (FIG. 6), the threaded portion 34 of the shank 26 is abutted or engaged with the projections 46a, 46b, 46c, such that the fastener 18 is prevented from falling out of the aperture 42 by the engine component 14 itself. When the engine component 14 is handled in a non-inverted or upright orientation (FIG. 7), the head 22 of the fastener 18 is directly supported on the engine component 14. As a result, the movement of the fastener 18 relative to the engine component 14 is constrained between the first position, in which the threaded portion 34 and the projections 46a, 46b, 46c are engaged (FIG. 6), and the second position, in which the head 22 of the fastener 18 is directly supported on or engaged with the engine component 14 (FIG. 7).

Figure 8:
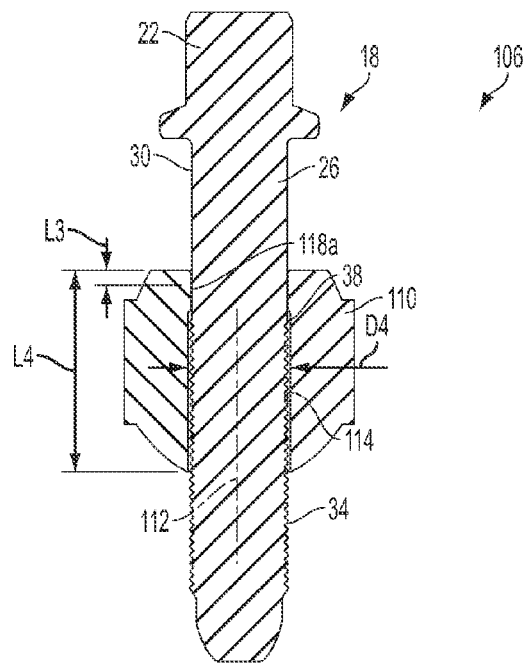
FIG. 8 is a cross-sectional view of a second construction of a unitized component assembly of the invention, including a component and a fastener unitized to the component.

FIG. 8 illustrates a second construction of a unitized component assembly 106 according to the invention. The assembly 106 includes a component (e.g., an engine component 110) and a fastener 18 coupled to the engine component 110. Although the illustrated engine component 110 is a rocker arm pivot, the engine component 110 may be configured as any of a number of different components that are secured to the engine using the fastener 18. The fastener 18 is substantially identical to the fastener 18 utilized with the engine component assembly 10 of FIG. 1. Therefore, like reference numerals are used to describe like features of the fastener 18.

Figure 9:
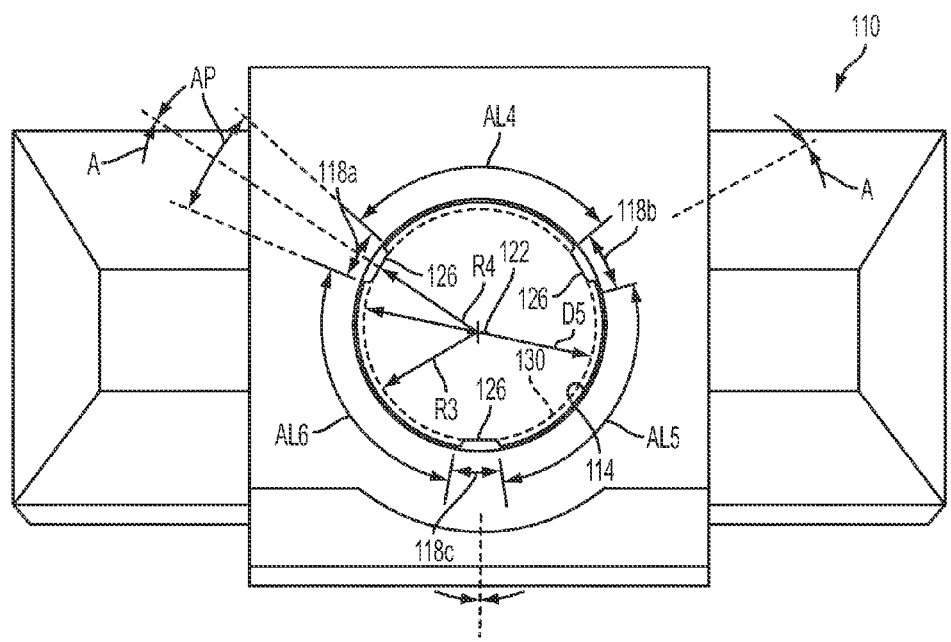
FIG. 9 is a top view of the component of FIG. 8, illustrating an aperture and a plurality of discrete projections extending into the aperture.
Figure 10:
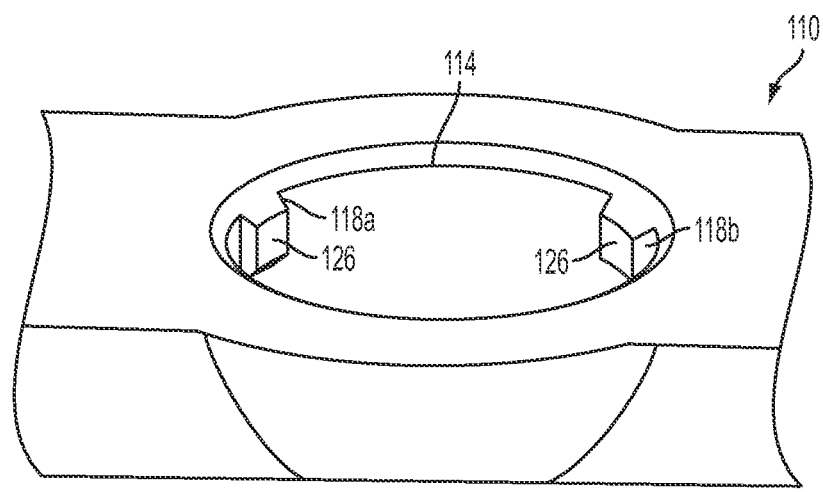
FIG. 10 is a top perspective view of the component of FIG. 8, illustrating two of the projections in the aperture.

The engine component 110 includes an aperture 114 (FIG. 8) and a plurality of discrete projections 118a, 118b, 118c (FIG. 9) extending into the aperture 114. As shown in FIG. 9, the projections 118a, 118b, 118c are spaced apart from one another about the perimeter of the aperture 114. Specifically, the engine component 110 includes three projections 118a, 118b, 118c that are equidistantly spaced from each other by an angle A of about 120 degrees with respect to a central axis 122 of the aperture 114. Each of the projections 118a, 118b, 118c includes a radially inwardly-extending, arcuate surface 126.

With continued reference to FIG. 9, the projections 118a, 118b are separated from each other by an arc length AL4 defined by a constant radius R3 with respect to the central axis 122. Likewise, the projections 118b, 118c and the projections 118c, 118a are separated from each other by respective arc lengths AL5, AL6 each defined by the constant radius R3 with respect to the central axis 122. The arcuate surfaces 126 of the respective projections 118a, 118b, 118c are each defined by a constant radius R4.

With reference to FIG. 8, each of the projections 118a, 118b, 118c includes an axial length L3 that is less than the axial length L4 of the aperture 114. Specifically, the ratio of the axial length L3 of each of the projections 118a, 118b, 118c to the axial length L4 of the aperture 114 is about 0.07:1 or less. In the illustrated construction of the engine component assembly 106, the projections 118a, 118b, 118c are positioned toward the upper end of the aperture 114. Alternatively, the projections 118a, 118b, 118c may be positioned toward the bottom end of the aperture 114, the middle of the aperture 114, or at any location along the length of the aperture 114.

With continued reference to FIG. 8, the aperture 114 includes a substantially circular cross-section, defining a diameter D4, below the projections 118a, 118b, 118c. In the illustrated construction of the engine component assembly 106, the diameter D4 is equal to twice the radius R3 of each of the arc lengths AL4, AL5, AL6. Alternatively, the diameter D4 may not coincide with twice the radius R3 of each of the arc lengths AL4, AL5, AL6. With reference to FIG. 9, the radially inwardly-facing arcuate surfaces 126 of the respective projections 118a, 118b, 118c each include a curvature defined by a circle 130 concentric with the aperture 114 and having a diameter D5. Preferably, the ratio of the diameter D5 to the diameter D4 is between about 0.92:1 and about 0.98:1. In the illustrated construction of the engine component assembly 106, the ratio of the diameter D5 to the diameter D4 is about 0.95:1. In the illustrated construction of the engine component assembly 106, the diameter D5 is equal to twice the radius R4 of each of the projections 118a, 118b, 118c. Alternatively, the respective surfaces 126 of the projections 118a, 118b, 118c may not be defined by the constant radius R4, such that one or more portions of each of the projections 118a, 118b, 118c may be tangent with the circle 130.

With continued reference to FIG. 9, the arcuate surfaces 126 of the respective projections 118a, 118b, 118c each include an arc length AP. In the illustrated construction of the engine component assembly 106, the arc length AP of each of the projections 118a, 118b, 118c is about 20 degrees. Alternatively, the arc length AP of each of the projections 118a, 118b, 118c may be greater than or less than about 20 degrees. To facilitate hand-threading the fastener 18 to the engine component 14 as discussed below, the ratio of the sum of the arc lengths AP of the respective projections 118a, 118b, 118c to the circumference of the aperture 114 (i.e., an arc length of 360 degrees) is between about 0.15:1 and about 0.20:1. In the illustrated construction of the engine component assembly 106, the ratio of the sum of the arc lengths AP of the respective projections 118a, 118b, 118c to the circumference of the aperture 114 is about 0.17:1.

To manufacture the engine component 110, the projections 118a, 118b, 118c are integrally formed with the body of the engine component 110 as a single piece (e.g., using a powdered metal process, a casting process, a forging process, etc.). The illustrated engine component 110 is manufactured as a single piece using a powdered metal process. Alternatively, one or more machining processes may be employed to create the projections 118a, 118b, 118c subsequent to creation of the body of the engine component 110.

The fastener 18 may be unitized to the engine component 110 using the same process described above, in which the threaded portion 34 of the fastener 18 is hand-threaded into the aperture 114, without the aid of tools, to at least partially deform at least one thread into each of the projections 118a, 118b, 118c. In other words, the projections 118a, 118b, 118c need not be pre-threaded before insertion of the fastener 18 into the aperture 114, thereby eliminating a manufacturing process (e.g., threading the projections 118a, 118b, 118c prior to insertion of the fastener 18) and its associated costs. After the fastener 18 is unitized to the engine component 110, the threaded portion 34 is engageable with the projections 118a, 118b, 118c to provide an axial stop for limiting movement of the fastener 18 relative to the engine component 110. As a result, engagement of the threaded portion 34 and the projections 118a, 118b, 118c substantially prevents removal of the shank 26 from the aperture 114.

Figure 11:
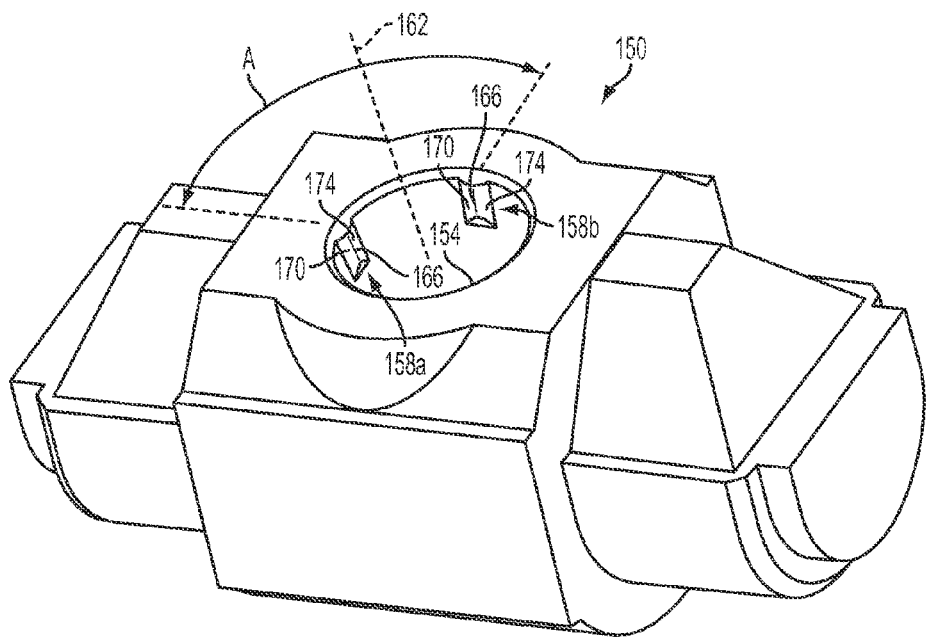
FIG. 11 is a top perspective view of a component of a third construction of a unitized component assembly of the invention.
Figure 12:
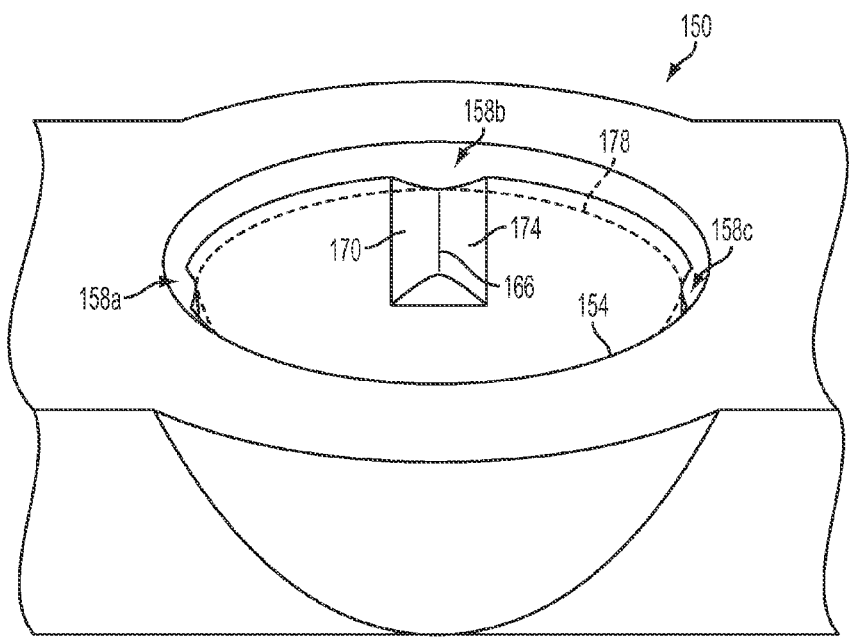
FIG. 12 is a top perspective view of the component of FIG. 11.
Figure 13:
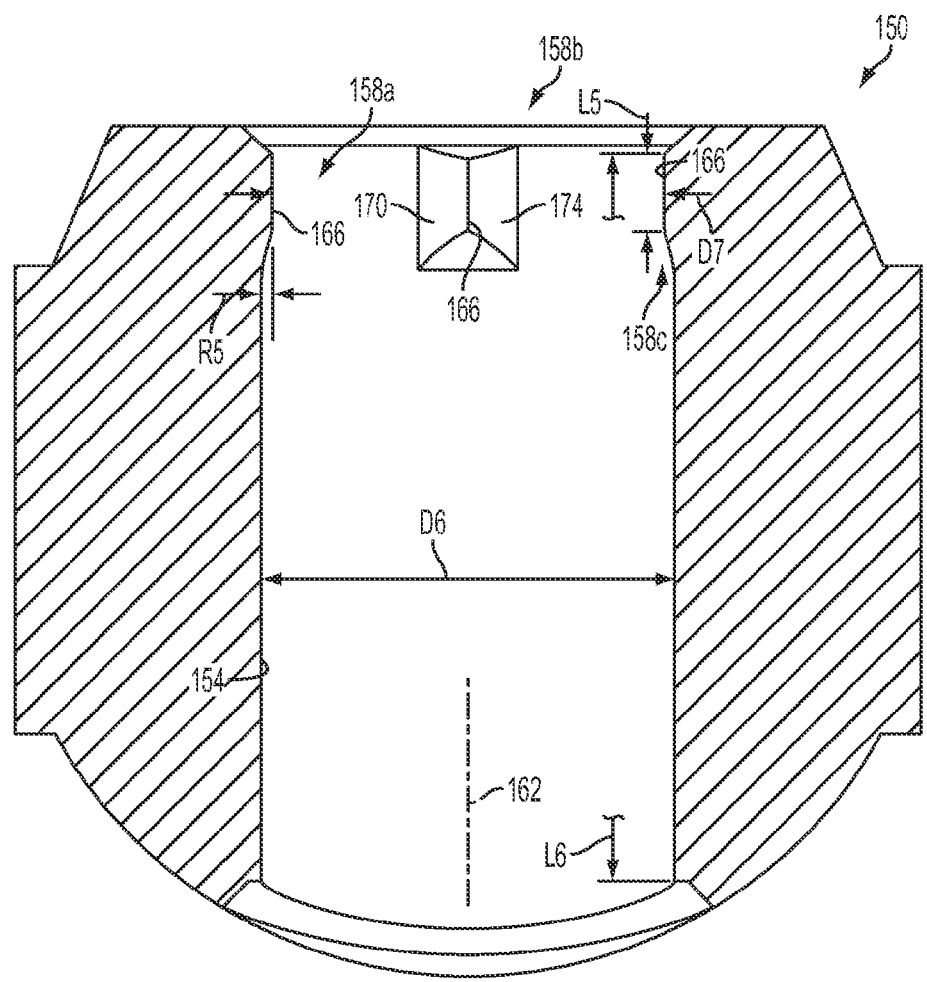
FIG. 13 is a cross-sectional view of the component of FIG. 11.

FIGS. 11-13 illustrate a component (e.g., an engine component 150) for use with a third construction of a component assembly according to the invention. Although the illustrated engine component 150 is a rocker arm pivot, the engine component 150 may be configured as any of a number of different components that are secured to the engine using the fastener 18 shown in FIGS. 1 and 6-8. Although not shown, the fastener 18 of FIGS. 1 and 6-8 may be unitized to the engine component 150 in a similar manner as described above with reference to the engine component assemblies 10, 106.

With reference to FIGS. 11-13, the engine component 150 includes an aperture 154 and a plurality of discrete projections 158a, 158b, 158c extending into the aperture 154. As shown in FIG. 12, the projections 158a, 158b, 158c are spaced apart from one another about the perimeter of the aperture 154. Specifically, the engine component 150 includes four projections 158a, 158b, 158c (only three of which are visible in FIGS. 11-13) that are equidistantly spaced from each other by an angle A of about 90 degrees (FIG. 11) with respect to a central axis 162 of the aperture 154. With reference to FIG. 12, each of the projections 158a, 158b, 158c includes an apex 166 and respective surfaces 170, 174 on either side of the apex 166. In the illustrated construction of the engine component 150, each of the surfaces 170, 174 is substantially flat. Alternatively, the respective surfaces 170, 174 of each of the projections 158a, 158b, 158c may include a curvature (e.g., a generally concave or convex curvature).

With reference to FIG. 13, each of the projections 158a, 158b, 158c includes an axial length L5 that is less than the axial length L6 of the aperture 154. Specifically, the ratio of the axial length L5 of each of the projections 158a, 158b, 158c to the axial length L6 of the aperture 154 is about 0.150:1 or less. In the illustrated construction of the engine component 150, the projections 158a, 158b, 158c are positioned toward the upper end of the aperture 154. Alternatively, the projections 158a, 158b, 158c may be positioned toward the bottom end of the aperture 154, the middle of the aperture 154, or at any location along the length L6 of the aperture 154. The aperture 154 includes a substantially circular cross-section, defining a diameter D6, below the projections 158a, 158b, 158c. The apices 166 of the respective projections 158a, 158b, 158c are tangent to a circle 178 (FIG. 12) concentric with the aperture 154 and having a diameter D7 (FIG. 13). Preferably, the ratio of the diameter D7 to the diameter D6 is between about 0.92:1 and about 0.98:1. In the illustrated construction of the engine component 150, the ratio of the diameter D7 to the diameter D6 is about 0.95:1.

The projections 158a, 158b, 158c may also be sized to include a radial dimension R5 (FIG. 13), extending radially inwardly from the wall defining the aperture 154 toward the central axis 162, such that about 50% or less of the thread depth of the fastener 18 is engaged with the projections 158a, 158b, 158c when the fastener 18 is unitized with the engine component 150. In the illustrated construction of the engine component 150, the projections 158a, 158b, 158c are sized having a radial dimension R5 such that about 50% of the thread depth of the fastener 18 is engaged with the projections 158a, 158b, 158c when unitized with the engine component 150. As shown in FIG. 13, the inner extent of the radial dimension R5 is aligned with the apex 166 of the projection 158a.

To manufacture the engine component 150, the projections 158a, 158b, 158c are integrally formed with the body of the engine component 150 as a single piece (e.g., using a powdered metal process, a casting process, a forging process, etc.). The illustrated engine component 150 is manufactured as a single piece using a powdered metal process. Alternatively, one or more machining processes may be employed to create the projections 158a, 158b, 158c subsequent to creation of the body of the engine component 150.

The fastener 18 (see FIGS. 1 and 6-8) may be unitized to the engine component 150 using the same process described above, in which the threaded portion 34 of the fastener 18 is hand-threaded into the aperture 154, without the aid of tools, to at least partially deform at least one thread into each of the projections 158a, 158b, 158c. In other words, the projections 158a, 158b, 158c need not be pre-threaded before insertion of the fastener 18 into the aperture 154, thereby eliminating a manufacturing process (e.g., threading the projections 158a, 158b, 158c prior to insertion of the fastener 18) and its associated costs. After the fastener 18 is unitized to the engine component 150, the threaded portion 34 is engageable with the projections 158a, 158b, 158c to provide an axial stop for limiting movement of the fastener 18 relative to the engine component 150. As a result, engagement of the threaded portion 34 and the projections 158a, 158b, 158c substantially prevents removal of the shank 26 from the aperture 154.

Various features of the invention are set forth in the following claims.

What is claimed is:

1. A method of unitizing a fastener and a component, the method comprising:
   providing the component with an aperture and a plurality of discrete projections extending into the aperture and spaced apart from one another about the perimeter of the aperture;
   providing the fastener with a head and a shank having a necked portion and a threaded portion adjacent the necked portion;
   inserting the shank into the aperture;
   at least partially deforming each of the projections during insertion of the threaded portion of the shank into the aperture;
   positioning the necked portion of the fastener in facing relationship with the projections after the projections have been deformed by the threaded portion of the shank; and
   engaging the threaded portion of the shank with the projections to provide an axial stop for limiting movement of the fastener relative to the component,
   wherein at least partially deforming each of the projections includes rotating the fastener to form at least one thread in each of the projections with the threaded portion of the fastener.

2. The method of claim 1, further comprising permitting the fastener to move axially within the aperture after the projections have been deformed by the threaded portion of the shank.

3. The method of claim 2, further comprising limiting movement of the fastener within the aperture between a first position, in which the threaded portion of the shank is engaged with the projections to prevent removal of the shank from the aperture, and a second position, in which the head is engaged with the component.

4. The method of claim 2, wherein permitting the fastener to move axially within the aperture includes permitting the fastener to move axially without rotation.

5. The method of claim 2, further comprising limiting movement of the fastener within the aperture by an amount substantially equal to the length of the necked portion of the fastener.

6. The method of claim 1, wherein providing the plurality of discrete projections includes integrally forming the projections as a single piece with the component.

7. The method of claim 6, wherein integrally forming the projections as a single piece with the component includes forming the component and the projections as a single piece using a powdered metal process.

8. The method of claim 1, wherein providing the plurality of discrete projections includes forming the projections on the component after the component has been made.

9. The method of claim 8, wherein forming the projections on the component after the component has been made includes machining the projections on the component.

10. The method of claim 1, wherein rotating the fastener includes rotating the fastener without using tools.

11. A method of unitizing a fastener and a component, the method comprising:
    providing the component with an aperture and a plurality of discrete projections extending into the aperture and spaced apart from one another about the perimeter of the aperture, each discrete projection being formed by a first curved surface and a second curved surface forming an apex at an intersection thereof;
    providing the fastener with a head and a shank having a necked portion and a threaded portion adjacent the necked portion;
    inserting the shank into the aperture;
    at least partially deforming each of the projections during insertion of the threaded portion of the shank into the aperture;
    positioning the necked portion of the fastener in facing relationship with the projections after the projections have been deformed by the threaded portion of the shank; and
    engaging the threaded portion of the shank with the projections to provide an axial stop for limiting movement of the fastener relative to the component.

12. The method of claim 11, further comprising permitting the fastener to move axially within the aperture after the projections have been deformed by the threaded portion of the shank.

13. The method of claim 12, further comprising limiting movement of the fastener within the aperture between a first position, in which the threaded portion of the shank is engaged with the projections to prevent removal of the shank from the aperture, and a second position, in which the head is engaged with the component.

14. The method of claim 12, wherein permitting the fastener to move axially within the aperture includes permitting the fastener to move axially without rotation.

15. The method of claim 12, further comprising limiting movement of the fastener within the aperture by an amount substantially equal to the length of the necked portion of the fastener.

16. The method of claim 11, wherein providing the plurality of discrete projections includes integrally forming the projections as a single piece with the component.

17. The method of claim 16, wherein integrally forming the projections as a single piece with the component includes forming the component and the projections as a single piece using a powdered metal process.

18. The method of claim 11, wherein at least partially deforming each of the projections includes rotating the fastener to form at least one thread in each of the projections with the threaded portion of the fastener.

19. The method of claim 18, wherein rotating the fastener includes rotating the fastener without using tools.

\* \* \* \* \*